United States Patent [19]
Wiseley et al.

[11] 3,949,249
[45] Apr. 6, 1976

[54] ELECTRO-MAGNETIC RECIPROCATING MOTOR

[75] Inventors: Kenneth Wiseley, c/o Pat Walker, 214½ S. 17th St.; Elton M. Botts, 2817 Western Ave., both of Mattoon, Ill. 61938

[73] Assignee: L. Z. Reece, et al

[22] Filed: Aug. 2, 1974

[21] Appl. No.: 494,368

[52] U.S. Cl. .................. 310/17; 336/84; 310/23
[51] Int. Cl.² .............................. H02K 33/06
[58] Field of Search ...... 336/84; 335/234, 231, 268, 335/301, 213, 229, 230; 310/23, 24, 17, 34, 35, 32

[56] References Cited
UNITED STATES PATENTS

| | | | |
|---|---|---|---|
| 2,486,948 | 11/1949 | Hinchman | 310/34 |
| 2,568,757 | 9/1951 | Mesh | 310/30 |
| 3,202,886 | 8/1965 | Kramer | 335/268 X |
| 3,205,415 | 9/1965 | Seki et al. | 335/301 X |
| 3,504,315 | 3/1970 | Stanwell | 335/234 |
| 3,549,830 | 12/1970 | Hofman | 335/231 X |

FOREIGN PATENTS OR APPLICATIONS 550,249  12/1942  United Kingdom................. 310/32

*Primary Examiner*—Donovan F. Duggan
*Attorney, Agent, or Firm*—Clarence A. O'Brien; Harvey B. Jacobson

[57] ABSTRACT

A magnetic motor wherein a piston mounted magnet is reciprocated through a predetermined stroke in timed relation to polarity reversal of a pair of electro-magnetic assemblies at opposite axial ends of the piston cylinder. Polarity reversal and the intensity of the magnetic field is varied as a function of piston movement through a distributor to control the output of the motor. Hysteresis and flux leakage is reduced by an arrangement of permanent magnets and magnetic spheroids associated with one of the electro-magnetic assemblies.

7 Claims, 9 Drawing Figures

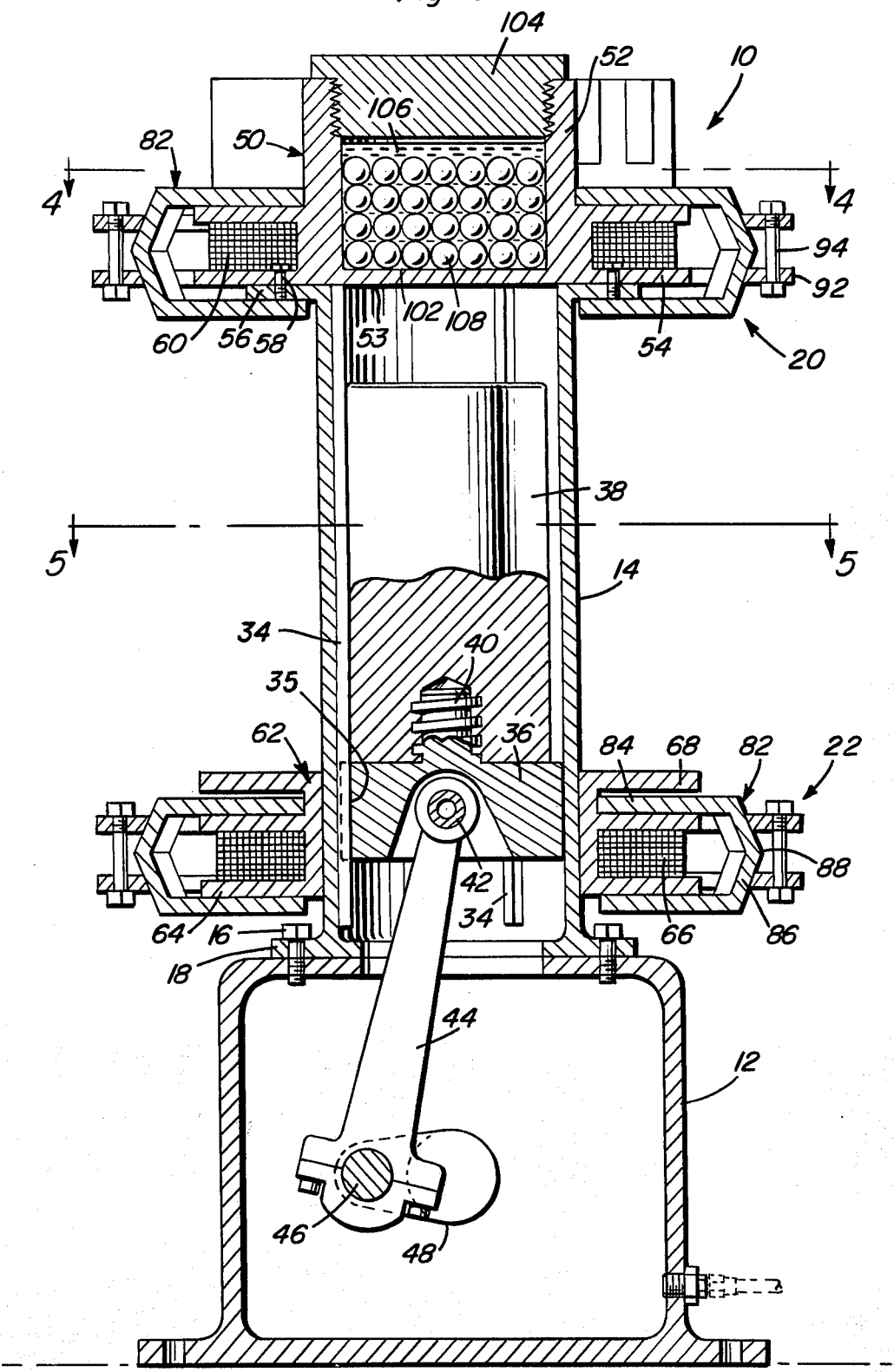

ELECTRO-MAGNETIC RECIPROCATING MOTOR

This invention relates to the conversion of electrical energy into mechanical energy and more particularly to a magnetic motor of the reciprocating type.

Reciprocating types of magnetic motors wherein a magnetic piston is reciprocated relative to a varying magnetic field, is well known. Such magnetic motors have not performed efficiently and have not therefore been generally adopted for commercial or industrial purposes. One of the main drawbacks of such magnetic motors, has been the energy losses resulting from hysteresis and flux leakage. It is therefore an important object of the present invention to provide a more efficient magnetic motor of the reciprocating type which overcomes the aforementioned drawbacks of prior art arrangements.

The prior art of which applicant is aware, includes the disclosures in U.S. Pat. Nos. 3,394,295, 3,444,402, 3,534,203, 3,539,845 and 3,686,521.

In accordance with the present invention, a permanent magnet secured to a reciprocating piston, is reciprocated through a predetermined stroke within a cylinder on which a pair of electro-magnetic devices are mounted adjacent opposite axial ends. The current conducted through the magnetic field producing windings associated with the electro-magnetic devices, is controlled through a distributor to both produce a reversal in polarity of the magnetic fields and to vary the magnitude of the magnetic fields between polarity reversals in order to maintain reciprocating movement of the piston by magnetic attraction and repulsion. In order to reduce hysteresis, and the energy losses incident thereto, a plurality of magnetic spheroids are immersed in a body of damping fluid enclosed within a cavity disposed in axial alignment with the flux emitting face associated with one of the electro-magnetic devices. Sector shaped permanent magnets angularly spaced in enclosing relation to the magnetic field producing winding together with axially spaced permanent bar magnets of opposite polarity, are mounted on the core associated with the aforementioned electro-magnetic device in order to concentrate magnetic flux through the reciprocating piston magnet to thereby reduce flux leakage.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is an enlarged sectional view taken substantially through a plane indicated by section line 3—3 in FIG. 1.

Figure 1:
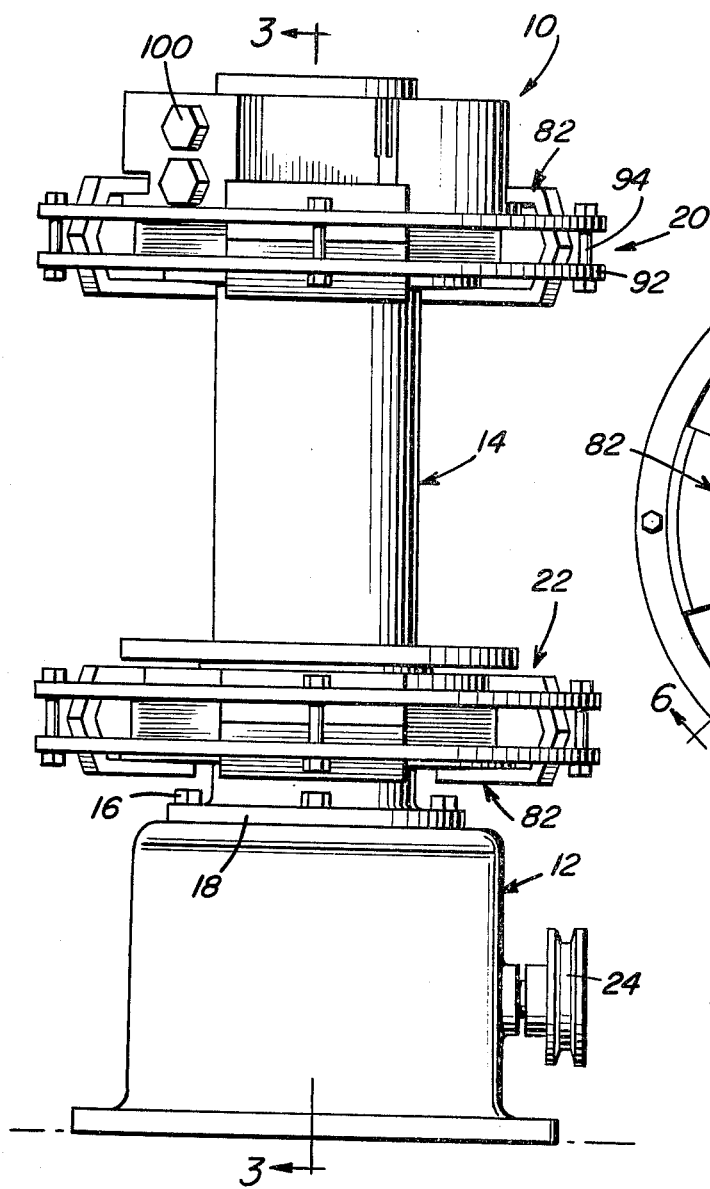
FIG. 1 is a side elevational view of one embodiment of a magnetic reciprocating motor constructed in accordance with the present invention.

One form of a magnetic reciprocating motor constructed in accordance with the present invention, is shown in FIG. 1 and is generally denoted by reference numeral 10. The motor includes a base 12 to which a vertical, tubular housing or cylinder 14 is bolted by means of fasteners 16 extending through a flange 18 formed at the lower end of the cylinder. A pair of electromagnetic assemblies 20 and 22 are mounted on the cylinder adjacent opposite axial ends. A rotating mechanical output is obtained from the motor through a power shaft extending horizontally from the base to which an output pulley wheel 24 may be connected. The pulley wheel may be drivingly connected to any desired mechanical load or to an electrical generator.

Figure 9:
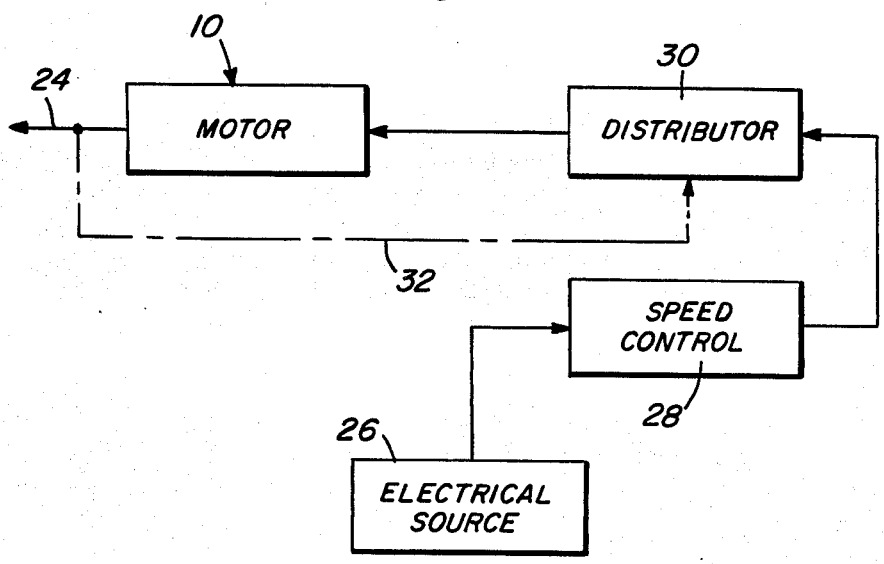
FIG. 9 is a simplified block diagram illustrating the energy conversion system associated with the present invention.

As diagrammatically shown in FIG. 9, energy may be supplied to the motor 10 from an electrical source 26 through a speed control device 28 and a distributor 30. A driving connection 32 is provided between the output of the motor and the distributor 30 in order to control the supply of electrical energy to the motor as a function of the mechanical movement produced by the motor.

Figure 5:
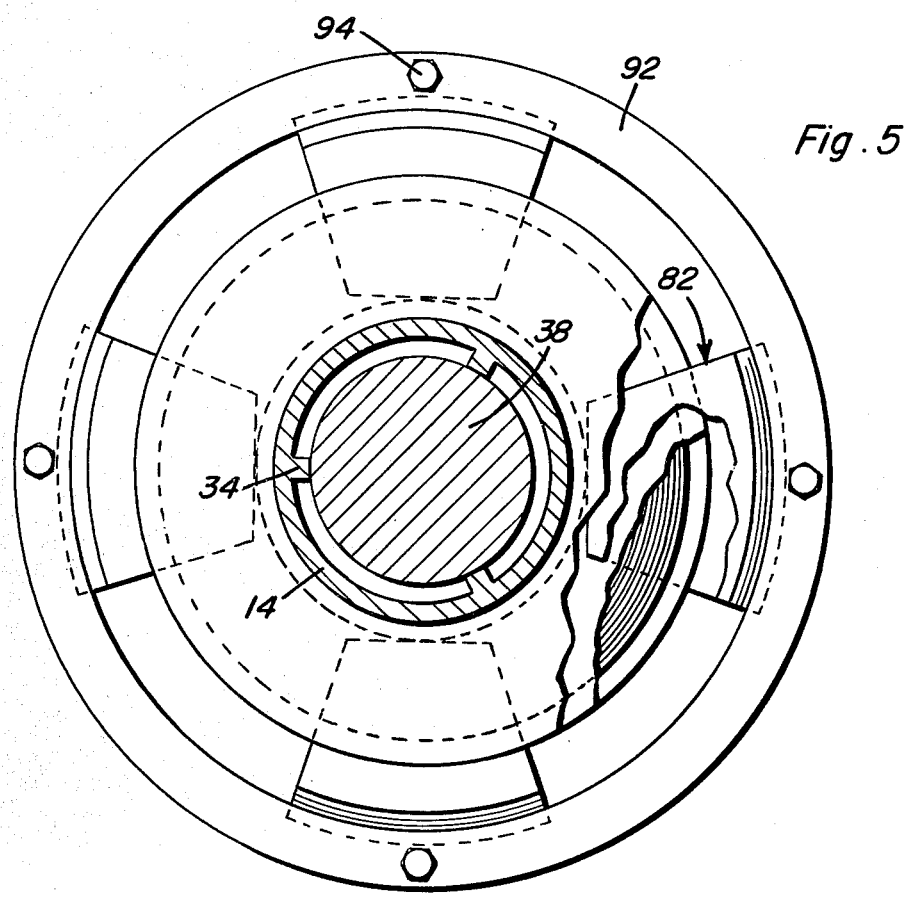
FIG. 5 is a transverse sectional view taken substantially through a plane indicated by section line 5—5 in FIG. 3, with parts broken away.

Referring now to FIG. 3 in particular, the base 12 and cylinder 14 are preferably made of a non-ferrous metal such as aluminum. The cylinder is internally provided with guide rails 34 to guide slidable reciprocating movement of a piston member 36 to which an elongated cylindrical shaped permanent magnet 38 of smaller diameter is threadedly connected by means of the threaded connector 40. Keyway slots 35 are formed in the piston member 36 for slidably receiving the guide rails 34. The radial clearance between the cylinder 14 and the magnet 38 will form a cooling passage for air circulation during reciprocation of the magnet to help maintain the proper temperature, as more clearly seen in FIG. 5. The piston member 36 is connected by means of a wrist pin 42 to a connecting rod 44 which extends into the base 12 from the cylinder. The connecting rod is connected by means of a crankpin 46 to a crank 48 to which the output shaft of the motor is connected. The piston member 36, and the connecting rod 44 are made of non-magnetic materials such as stainless steel. Thus, the flux path for the magnetic field generated by the electro-magnetic devices 20 and 22 is mostly confined to paths extending axially through the reciprocating permanent magnet 38 connected to the piston member.

The electro-magnetic assembly 20 includes a core made of aluminum and generally referred to by reference numeral 50. The core 50 includes a cylindrical portion 52 which extends from a flux emitting face 53 closing the upper end of the cylinder 14 and an annular spool portion 54 to which the upper flange 56 of the cylinder is connected by fasteners 58. A magnetic field producing winding 60 is mounted within the spool portion 54 of the core 50 and is electrically connected to the source of electrical energy 26 as aforementioned through the distributor 30 as will be explained in detail hereafter. The other electromagnetic assembly 22 also includes a core 62 made of aluminum and secured to the cylinder 14 adjacent the lower end. The core 62 also includes a spool portion 64 on which a magnetic field producing winding 66 is mounted, the winding 66 also being connected to the source of electrical energy through the distributor 30. A protective flange 68 extends from the core 62 in parallel spaced relationship to the spool portion 64.

Figure 8:
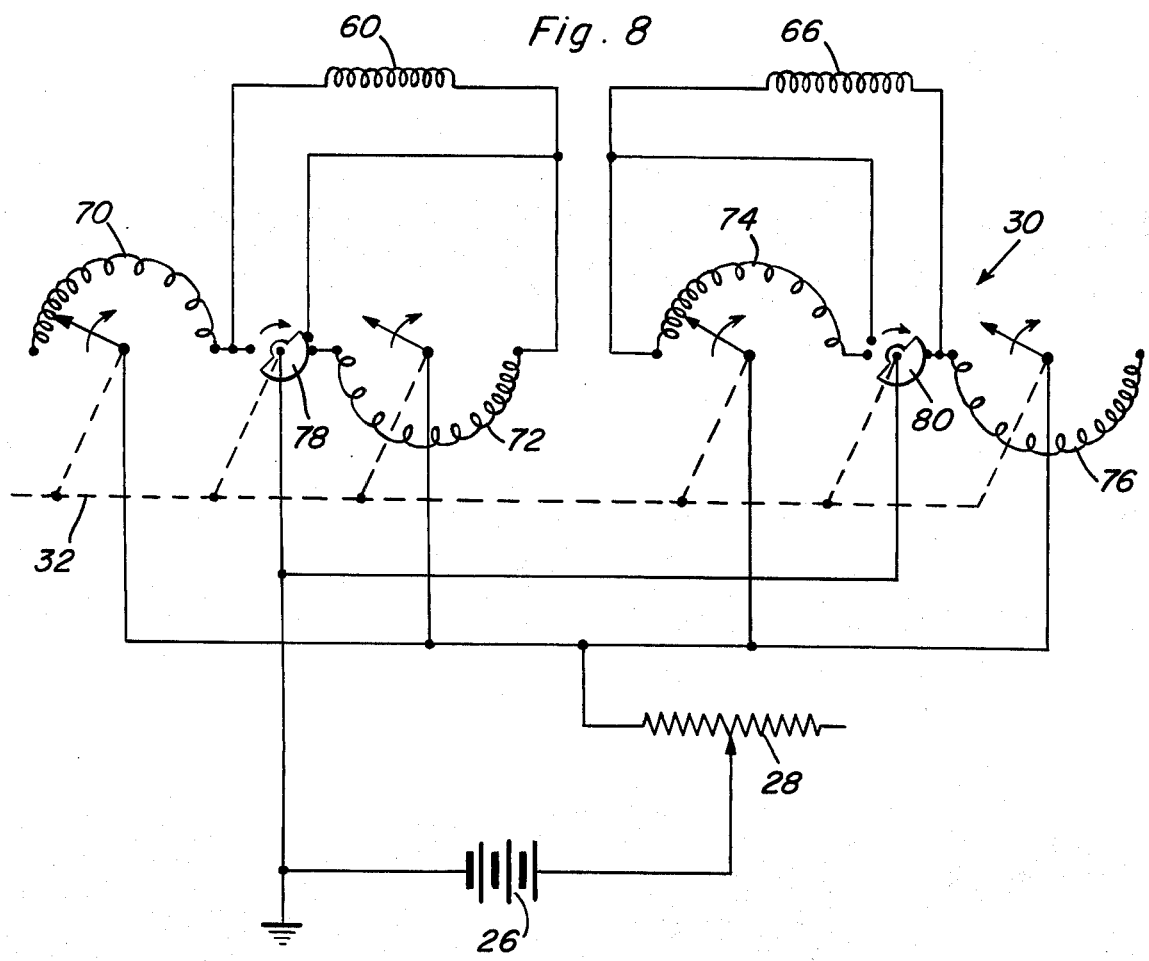
FIG. 8 is a simplified electrical circuit diagram of typical controls associated with the magnetic motor.

The direction of current and the magnitude of current is controlled through the distributor in order to maintain a smooth and continuous reciprocating movement of the magnet 38 by magnetic attraction and repulsion. Toward that end, the electrical source 26 such as a battery as illustrated in FIG. 8, is connected through a rheostat type of speed control 28 to the rotating wiper arms associated with variable resistors 70, 72, 74 and 76. The resistors or distributor coils 70 and 72 are interconnected in series with the electromagnetic winding 60 so as to vary the resistance connected in series therewith as an inverse function of wiper arm movement. The rheostat winding 70 is therefore wound so that its coil spacing increases in the direction of wiper arm movement during a phase somewhat less than 180° during which current, decreasing at a rate proportional to movement of magnet 38 is conducted through winding 60 to generate a magnetically attractive force between magnet 38 and magnetic assembly 20. During the next 180° phase, current is directed in the opposite direction through winding 60 by wiper contact with rheostat winding 72 to generate a repelling force between magnet 38 and the assembly 20. The rheostat windings 74 and 76 operate in a similar fashion but are synchronized so that current is conducted through winding 66 to generate a magnetic force opposite to the force generated by current in winding 60. The resistor wiper arms are drivingly connected in any suitable fashion to the mechanical output of the motor in order to synchronize the reciprocating movement of the piston with the change in the resistances connected in series with the electro-magnetic windings 60 and 66. The energizing circuit through the windings 60 and 66 in series with the resistances is completed through polarity reversing switch devices 78 and 80 which are also rotated by the driving connection 32. By means of the foregoing arrangement, the variation in the intensity of the magnetic field and the polarity of the magnetic field established by the electro-magnetic assemblies 20 and 22 will be varied in proper relation to the reciprocating motion of the piston to yield a smooth, continuous power output without undue jarring of the piston magnet 38. The speed of the motor output and the associated torque, may be varied by controlling the magnitude of the current conducted through the electro-magnetic coils and toward that end, the speed controlling rheostat 28 is adjusted.

Figure 2:
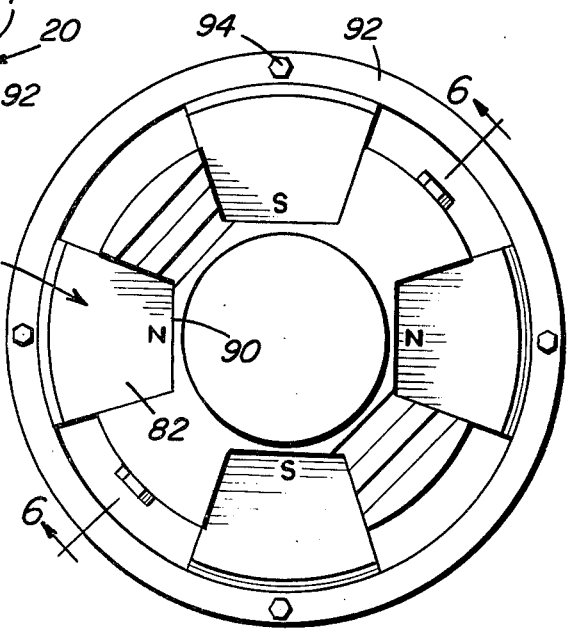
FIG. 2 is a top plan view of the magnetic motor shown in FIG. 1.
Figure 7:
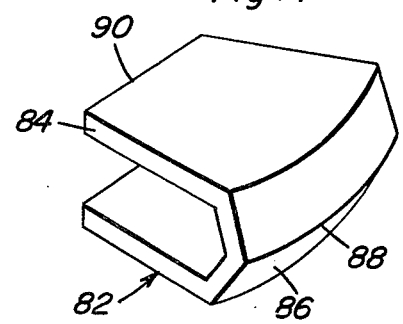
FIG. 7 is a perspective view of one of the sector shaped permanent magnets associated with one of the electro-magnetic assemblies on the magnetic motor shown in FIG. 1.
Figure 4:
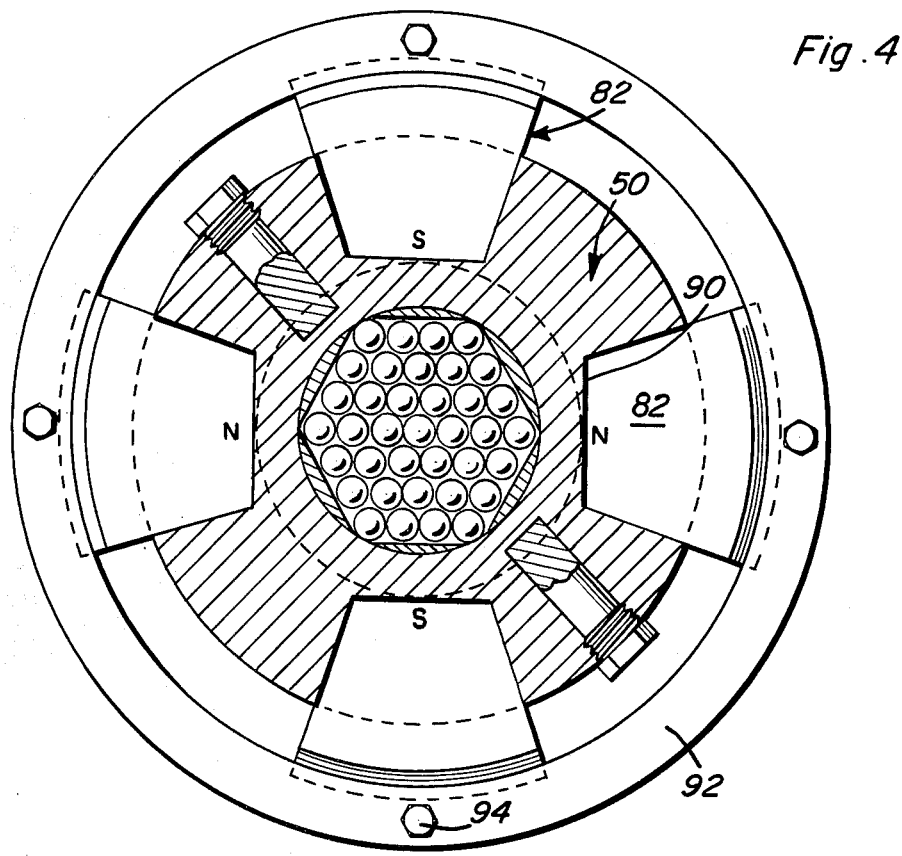
FIG. 4 is a transverse sectional view taken substantially through a plane indicated by section line 4—4 in FIG. 3.

In order to concentrate the energy associated with the magnetic fields produced by the electro-magnetic assemblies, each of the electro-magnetic assemblies is provided with a plurality of sector-shaped, permanent magnets 82. As more clearly seen in FIG. 7, each of the magnets 82 includes parallel spaced plate portions 84 interconnected by a radially outer arcuate connector portion 86 that converge outwardly to an edge 88. The magnets 82 have pole faces along the radially inner edges 90. The permanent magnets 82 are positioned on the spool portions 54 and 64 of the electro-magnetic cores in angularly spaced relationship to each other as more clearly seen in FIGS. 2 and 4 to thereby embrace the electro-magnetic windings 60 and 66 mounted within the spool portions of the cores. The sector-shaped magnets 82 are retained in position by pairs of annular retainer rings 92 engaging the arcuate portions 86 of the magnets above and below the edges 88, each pair of retainer rings 92 being interconnected by fastener assemblies 94 as more clearly seen in FIG. 3. Furthermore, the permanent magnets 82 are of opposite polarity adjacent to each other as indicated in FIGS. 2 and 4. According to one theory, the permanent magnets 82 confine the energy of the electro-magnetic fields produced by current in the windings to smaller orbits about the coils of the windings. Further, the alternate polarity of the permanent magnets 82 will augment the energy confining effect of the magnets by virtue of their physical relationship to the electro-magnetic windings.

Figure 6:
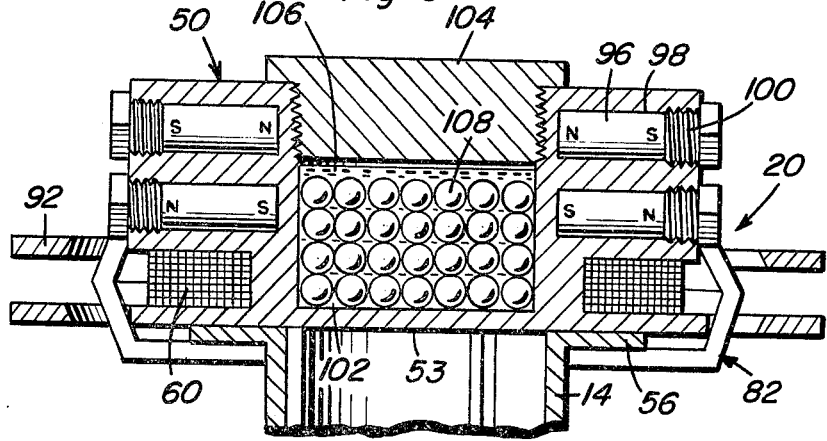
FIG. 6 is a partial sectional view taken substantially through a plane indicated by section line 6—6 in FIG. 2.

In order to prevent escape of magnetic energy or flux leakage, radially positioned bar magnets 96 are positioned in axially spaced relationship to each other within cylindrical bores 98 formed in the core 50 as more clearly seen in FIGS. 4 and 6. The bar magnets 96 are retained in the bores 98 by threaded caps 100. The axially spaced bar magnets are of opposite polarity in order to form closed magnetic flux paths that will entrap any magnetic flux energy attempting to escape from the upper axial end of the electro-magnetic assembly 20.

In order to reduce the energy losses that otherwise occur from magnetic hysteresis, a cavity 102 is formed in the core 50 associated with the electro-magnetic device 20 as more clearly seen in FIGS. 3 and 6, the cavity being closed by a threaded end cap 104. The cavity is filled with a damping fluid 106 in which a plurality of magnetic spheroids 108 are immersed. These magnetic spheroids are soft iron spherical balls that are nickel or chromium plated. Upon collapsing of the electro-magnetic field produced by the electro-magnetic assemblies, the spheroids will have a tendency to rotate 90° and align their weak poles with each other. Upon reversal of polarity, the poles will swing on additional 90° to align themselves with the prevailing polarity of the magnetic field in order to concentrate flux lines from the flux emitting face 53. Over travel of the balls as a result of the polarity reversals, is prevented by the damping fluid 106.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a magnetic motor having a tubular housing slidably mounting a magnetic piston and a pair of electro-magnetic devices mounted on the housing adjacent opposite axial ends for inducing reciprocation of the piston, at least one of said electro-magnetic devices including a core having a flux emitting face closing one axial end of the tubular housing and a winding mounted on the core, and flux concentrating means mounted on said core for confining the magnetic field to the tubular housing, said flux concentrating means including sector-shaped magnets mounted on said core in circumferentially spaced relation to each other and in radially embracing relation to the magnetic field producing winding, angularly adjacent ones of the sector-shaped magnets being of opposite polarity, and a plurality of axially spaced magnets of opposite polarity mounted on the core in axially spaced relation to the winding remote from the flux emitting face.

2. In a non-magnetic magnetic motor having a tubular housing slidably mounting a magnetic piston and a pair of electro-magnetic devices mounted on the housing adjacent opposite axial ends thereof for inducing reciprocation of the piston, at least one of said electro-magnetic devices including a core having a flux emitting face closing one axial end of the tubular housing and a winding mounted on the core, and hysteresis reducing means mounted in the core in axial alignment with said flux emitting face.

3. The combination of claim 2 including variable resistance means connected to the electro-magnetic devices for cyclically varying the magnetic field in magnitude as a function of said reciprocating motion of the piston, and switching means interconnected between the source and the variable resistance means for periodically reversing the polarity of the magnetic field in timed relation to said reciprocating motion.

4. In a magnetic motor having a tubular housing slidably mounting a magnetic piston and a pair of electro-magnetic devices mounted on the housing adjacent opposite axial ends for inducing reciprocation of the piston, at least one of said electromagnetic devices including a core having a flux emitting face closing one axial end of the tubular housing and a winding mounted on the core, and hysteresis reducing means mounted on the core in axial alignment with said flux emitting face, said hysteresis reducing means including a cavity formed in the core in axial alignment with said flux emitting face, a plurality of magnetically polarized spheriods in said cavity and damping fluid filling said cavity with the spheriods immersed therein.

5. The combination of claim 4 including flux concentrating means mounted on the core for confining the magnetic field to the tubular housing.

6. The combination of claim 5 wherein said flux concentrating means includes sector-shaped magnets mounted on said core in circumferentially spaced relation to each other and in radially embracing relation to the magnetic field producing winding, angularly adjacent ones of the sector-shaped magnets being of opposite polarity, and a plurality of axially spaced magnets of opposite polarity mounted on the core in axially spaced relation to the winding remote from the flux emitting face.

7. The combination of claim 6 including variable resistance means connected to the electro-magnetic devices for cyclically varying the magnetic field in magnitude as a function of said reciprocating motion of the piston, and switching means interconnected between the source and the variable resistance means for periodically reversing the polarity of the magnetic field in timed relation to said reciprocating motion.

* * * * *